Jan. 17, 1950  J. N. APGAR  2,494,982
TRACTOR-SEMITRAILER COUPLING
Filed Nov. 19, 1948  3 Sheets-Sheet 1

Inventor:
John N. Apgar,
by Pierce, Scheffler & Parker,
Attorneys.

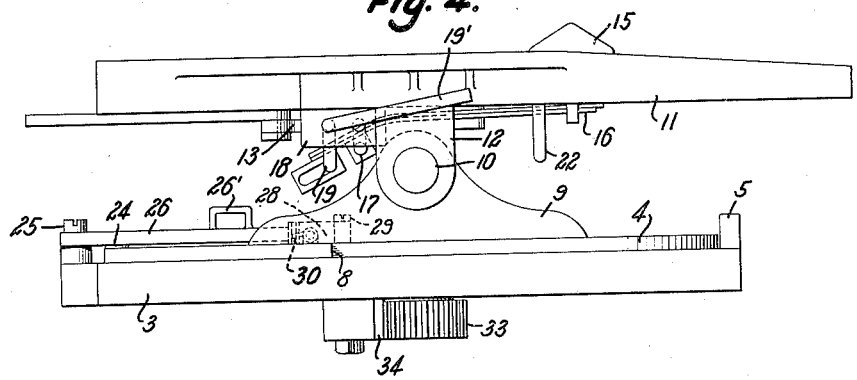
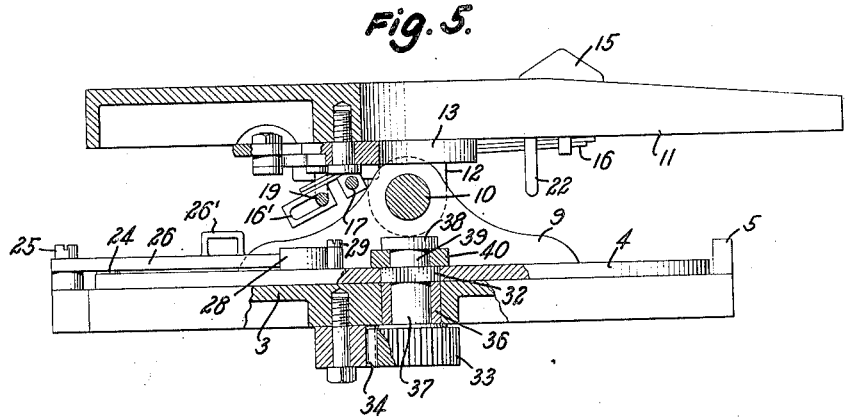
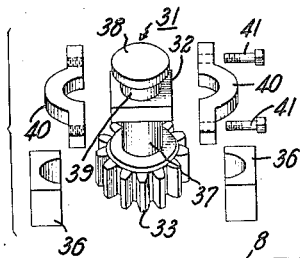
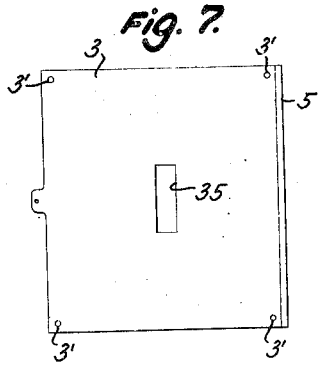
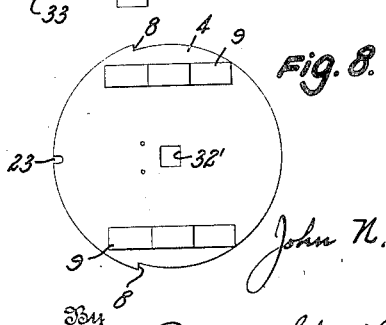

Jan. 17, 1950 J. N. APGAR 2,494,982
TRACTOR-SEMITRAILER COUPLING
Filed Nov. 19, 1948 3 Sheets-Sheet 3
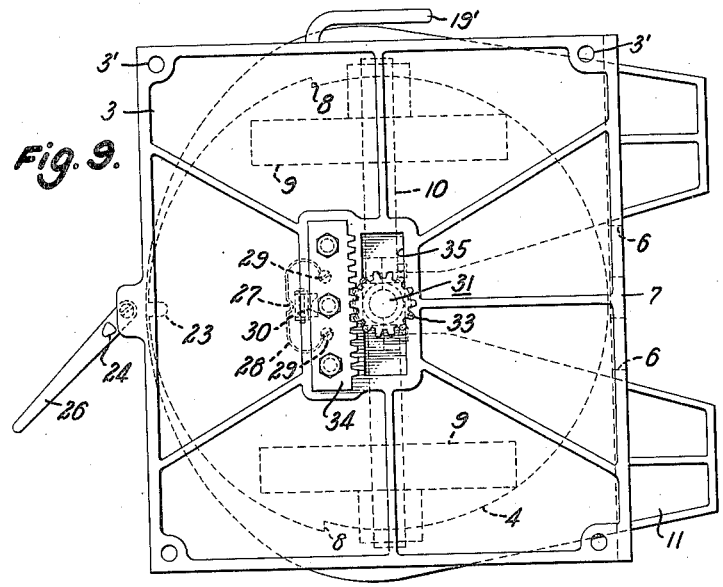
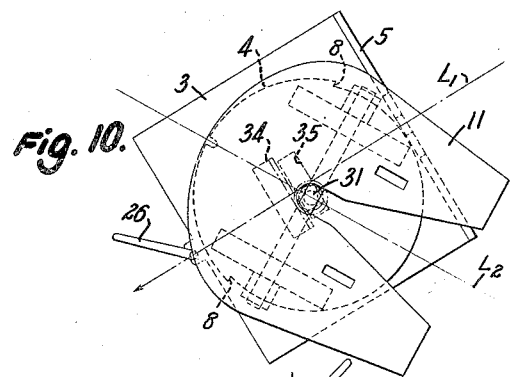
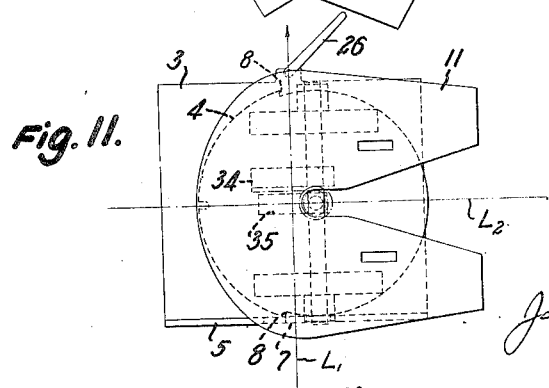

Patented Jan. 17, 1950

2,494,982

UNITED STATES PATENT OFFICE 2,494,982

TRACTOR-SEMITRAILER COUPLING

John N. Apgar, Bound Brook, N. J.

Application November 19, 1948, Serial No. 60,855

7 Claims. (Cl. 280—33.05)

This invention relates to tractor-semitrailer couplings, and more particularly to couplings of the type, as described in my prior Patent No. 2,442,914, issued June 8, 1948, in which the point of application of the trailer weight to the tractor is moved laterally as the tractor-trailer travels along a curved path, thereby to oppose centrifugal forces which tend to overturn the tractor.

As illustrated and described in the patent, the coupling comprises a turntable of two horizontally arranged plates, and the weight of the forward end of the trailer is transferred to the tractor through a horizontally arranged rockshaft supported on the upper turntable plate with its axis rearward of the pivotal axis of the turntable when the longitudinal axes of the tractor and semitrailer are alined for travel along a straight road. When the tractor-semitrailer assembly enters a curve, the relative rotation of the turntable plates displaces the rockshaft, which remains parallel to the wheel axis of the semitrailer, towards the center of the curve by an amount which is determined by the particular spacing of the rockshaft rearwardly of the vertical axis of the turntable. This increases the weight imposed upon the rear tractor wheel at the inside of the curve, thereby compensating to a greater or lesser extent for the centrifugal forces which tend to lift that wheel from the road surface.

Objects of the present invention are to provide tractor-semitrailer couplings of the turntable type in which compensation for centrifugal forces may be had when the trailer load is transmitted to the tractor along or substantially along the vertical axis of the turntable; that is, when the rockshaft for supporting the front end of the trailer is not displaced to the rear of the turntable axis. An object is to provide a tractor-semitrailer coupling of the turntable type in which the relative rotation of the turntable plates for travel along a curving roadway displaces the upper turntable plate, upon which the trailer load is imposed, laterally of the lower turntable plate and towards the interior of the curving roadway. An object is to provide a tractor-semitrailer coupling of turntable type in which the pin coupling of the turntable plates includes a pinion rigidly secured to the upper turntable plate and meshing with a rack carried by the lower turntable plate; the lower turntable plate being slotted to permit travel of the coupling pin laterally of the lower turntable plate upon relative angular movement of the plates.

These and other objects and the advantages of the invention will be apparent from the following specification when taken with the accompanying drawings in which:

Fig. 4 is a side elevation of those elements of a tractor-semitrailer coupling which are secured to the tractor unit;

Fig. 5 is a similar side elevation with various parts of the coupling shown in substantial central vertical section;

Fig. 6 is an exploded perspective view of the coupling pin and associated elements which are carried by the upper turntable plate of the coupling;

Figs. 7 and 8 are, respectively, plan views of the lower and upper plates of the turntable;

Fig. 9 is a bottom plan view of the turntable;

Fig. 10 is a somewhat schematic plan view of the turntable plates in their relative positions corresponding to travel of a tractor-semitrailer assembly along a curved path as shown in Fig. 2; and Fig. 11 is a similar somewhat schematic view of the turntable plates when the longitudinal axis of the tractor unit is turned clockwise by 90° from the longitudinal axis of the semitrailer unit.

Figure 1:
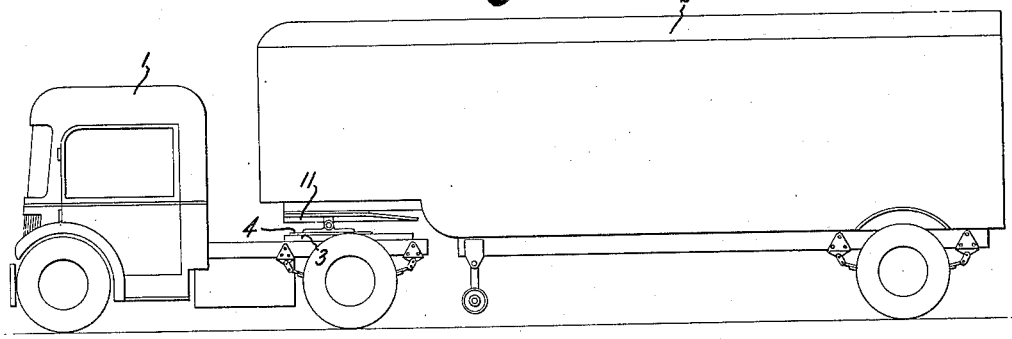
Fig. 1 is a side elevation of a tractor-semitrailer assembly connected by a coupling embodying the invention.

In the drawings, the reference numeral I identifies a tractor unit of a relatively short wheelbase type to which a semitrailer unit 2 is releasably coupled by a tractor-trailer coupling embodying the invention. The coupling elements include a turntable comprising a lower turntable plate 3 rigidly mounted on the tractor frame and an upper turntable plate 4 which are connected by means, to be described in detail hereinafter, which permits both angular and sliding movement of the turntable plates with respect to each other. The lower turntable plate 3 is preferably of rectangular shape and provided with openings 3' adjacent its corners for receiving clamping bolts by which the plate is mounted on a tractor unit 1.

The upper turntable plate is approximately circular, but with its rearward one-half of somewhat smaller radius than the forward section to clear a reinforcing and stop flange 5 which extends upwardly along the rear edge of the lower turntable plate. Openings 6, 6 are cut in the flange 5 at opposite sides of the longitudinal axis of the plate 3 to leave an integral stop rib 7, the openings being of such size that the radial flanges 8, 8 at the junction of the different radius sections of the plate 4 may enter the openings to engage the stop rib 7, thereby limiting the turning movement of the plate 4 to about 180°, i. e. limiting the turning of the tractor to about 90° with respect to the longitudinal axis of the coupled trailer.

Trunnions 9 are mounted on the turntable plate 4 to support a rockshaft 10 with the center of its axis vertically above the turntable coupling means when the axes of the tractor and trailer are alined, and the lower plate 11 of a fifth wheel coupling is journalled on the rockshaft 10 by trunnions 12. The fifth wheel plate is of conventional forked or yoke type for receiving the king pin of the cooperating fifth wheel plate which is carried by a semitrailer. An automatic or semi-automatic clutch 13 for locking engagement with the king pin is mounted on the lower face of the plate 11.

Latch keys 15 for locking engagement in openings of the upper fifth wheel plate 4 are carried by leaf springs 16 secured to a rod or shaft 17 journalled in openings in reinforcing ribs 18 at the lower face of the fifth wheel plate 11, and the key ends of the leaf springs may be turned towards and away from the plate 11 by a crank rod 19 to project the keys 15 above or to withdraw them below the upper surface of the plate 11. Crank rod 19 extends through slotted blocks 16' which are welded to the forward ends of the leaf springs 16, and one end 19' of the crank rod is bent at right angles to form an operating handle at an edge of the fifth wheel plate 11. The springs 16 are guided in U-shaped loops 22 which depend below the lower face of the plate 11, and the loops have the additional function of limiting the downward movement of the springs 16 and keys 15 into inoperative position.

Figure 3:
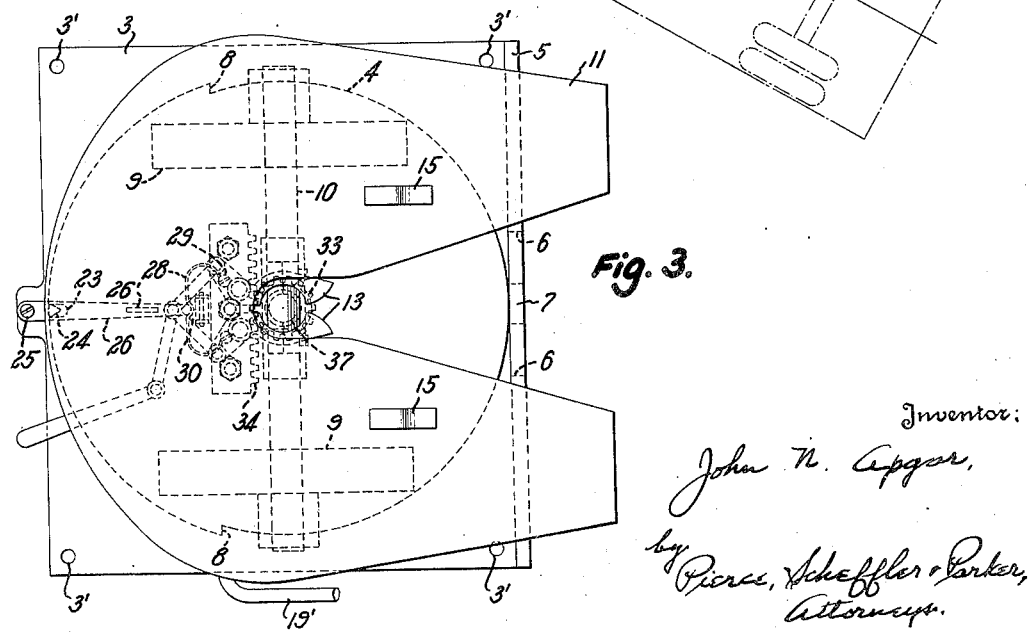
Fig. 3 is a plan view of the tractor-semitrailer coupling.

The keys 15 are lowered into inoperative position when a tractor equipped with the turntable fifth wheel assembly is to be coupled to a trailer with an upper fifth wheel plate of old type which does not have openings to receive the latch keys. The turntable plates 3 and 4 must be positively locked against relative movement in such case to retain the rockshaft 10 parallel to the tractor axles. The locking elements comprise a deep notch 23 in the forward edge of the turntable plate 4, and a cooperating lug 24 which is movable angularly about a pin 25 mounted at the forward edge of the lower turntable plate 3, the locking lug being integral with and lying below the pivoted end of a longer latching lever arm 26. The arm 26 extends radially over the plate 4, when the plates are latched together as shown in Figs. 3, 4 and 5, to seat in the central semicircular bend or recess 27 of a C-shaped leaf spring 28 whose ends are secured to the turntable plate 4 by bolts 29. A keeper 30, or small plate with an edge recessed to conform to the convex face of the bend 27 of spring 28, is pivotally mounted on plate 4 and may be turned over, from the inoperative position shown in Fig. 9, to embrace the bend 27 snugly and thereby prevent the release of the latch arm 26 from the spring 28, see Figs. 3 and 4. This positive locking of plate 4 against rotation is useful only when a tractor having the illustrated equipment is to be coupled to a trailer having a fifth wheel plate without openings for receiving the latch keys 15. In normal use of the equipment with trailers having fifth wheel plates with key-receiving openings, the plate 4 is impositively latched to the lower turntable plate by mutually turning the plate 4 and the latch arm 26 towards each other to enter the latch lug 24 in the plate recess 23, and to seat the end of the arm 26 within the recess 27 of the spring 28, as shown in Figs. 3 and 4. The latch arm 26 is preferably provided with an eye or raised loop 26' in which a hooked rod may be engaged for moving the latch arm. The keeper 30 is turned into inoperative position remote from the spring 28, as shown in Fig. 9. The fifth wheel plate 11 is thus latched in illustrated position with its forked opening symmetrically positioned with respect to the longitudinal axis of the tractor, Figs. 3 and 4. The tractor is backed towards a trailer which is to be picked up, and the king pin of the trailer enters the forked opening and is engaged by the clutch 13. The latch prevents inadvertent turning of the fifth wheel plate 11 by pressure of the king pin along an edge of the forked opening during this coupling-up operation, and the fifth wheel plate of the trailer rides over and depresses the latch keys 15 against the pressure exerted by the leaf springs 16. The trailer moves into axial alinement with the tractor on the initial forward travel, and the latch keys 15 then snap into the openings of the trailer fifth wheel plate to lock the fifth wheel plates against relative angular movement. On the first turning movement of the tractor, the latch spring 28 flexes under the pressure exerted upon the latching lug 24 by the turntable plate 4, and the latch lever 26 is released from its seat in the spring recess 27 and the turntable plate 4 rotates to throw the latch lug 24 out of the recess 23. The release of the impositive latch takes place automatically and requires no action by the tractor driver.

It is to be noted that both the turntable stops 7, 8 and the latch or lock mechanism are of simple but rugged design to resist the relatively heavy stresses encountered in the operation of tractor-trailer assemblies. Conventional stop pins of reasonable size would be inadequate to prevent jack-knifing but the stop rib 7 is heavily reinforced by the flange 5, which may be of any desired thickness, and the projecting flanges 8 can not be sheared off or crushed by heavy stresses. The latch or lock is particularly advantageous during the present change-over period when many trailers do not have apertured fifth wheel plates, and, therefore, the turntable plates 3, 4 must be locked against operation. Separate mechanism could be employed for the impositive latch and the positive lock for the turntable but, in accordance with the invention, a single mechanism may afford the impositive latching or the positive locking depending upon the adjustment of the keeper 30.

The apparatus as so far described affords high stability against jack-knifing and upset of the tractor-semitrailer assembly since the rockshaft 10 does not turn with the tractor unit 1 when the axes $L_1$, $L_2$ of the tractor unit 1 and semitrailer unit 2 move out of alinement when traveling along a curving roadway or when the assembly is backed along a curving path to position the rear end of the semitrailer unit 2 at the edge of a loading platform and with the axis $L_1$ of the tractor unit parallel to the platform edge. A further increase in stability is provided by the coupling between the turntable plates 3, 4 which, in accordance with this invention, compensates to a greater or less extent for centrifugal forces which tend to overthrow the tractor-semitrailer assembly when it enters a curving roadway; the compensation being effected by shifting the point of application of the trailer load to the tractor unit 1 laterally and towards the inside or center of curvature of the curving roadway.

The turntable plates 3 and 4 are coupled for relative angular and sliding movements by a pin, identified generally by reference numeral 31, which is secured against rotation in the upper turntable plate 4 by a non-circular, and preferably square, section 32 seated in a correspondingly shaped non-circular opening 32', see Fig. 8, in the plate 4. The lower end of the coupling pin 31 takes the form of a gear 33 in mesh with a rack 34 carried by and extending below the fixed turntable plate 3 at the forward edge of a slot 35 which extends transversely of the turntable plate 3. The coupling pin 31 is supported for sliding movement in the slot 35 by complementary bearing bushings 36 having semi-cylindrical interior surfaces seating upon the cylindrical section 37 of the coupling pin 31. The lateral displacement of the axis of the coupling pin 31 is a linear function of the angular displacement of the longitudinal axes $L_1$, $L_2$ of the tractor 1 and semitrailer 2, and the magnitude of the linear displacement for any given angular displacement is determined by the pitch diameter of the gear 33 when, as is illustrated, the rack 34 and the guide slot 35 are linear. It will be apparent that the lateral displacement of pin 31 with respect to the longitudinal axis $L_1$ of the tractor 1 will be a less-than-linear function of angular displacement of the axes $L_1$, $L_2$ of the tractor and semitrailer when the rack 34 and guide slot 35 are arcuate.

The coupling pin 31 has a head 38 which will pass through the opening 32' of plate 4 and the guide slot 35 of plate 3, and a reduced diameter section 39 below the head 38 for receiving complementary clamping straps 40 which are connected to each other by screws 41 to prevent axial displacement of the coupling pin 31 with respect to the turntable plates 3 and 4.

Figure 2:
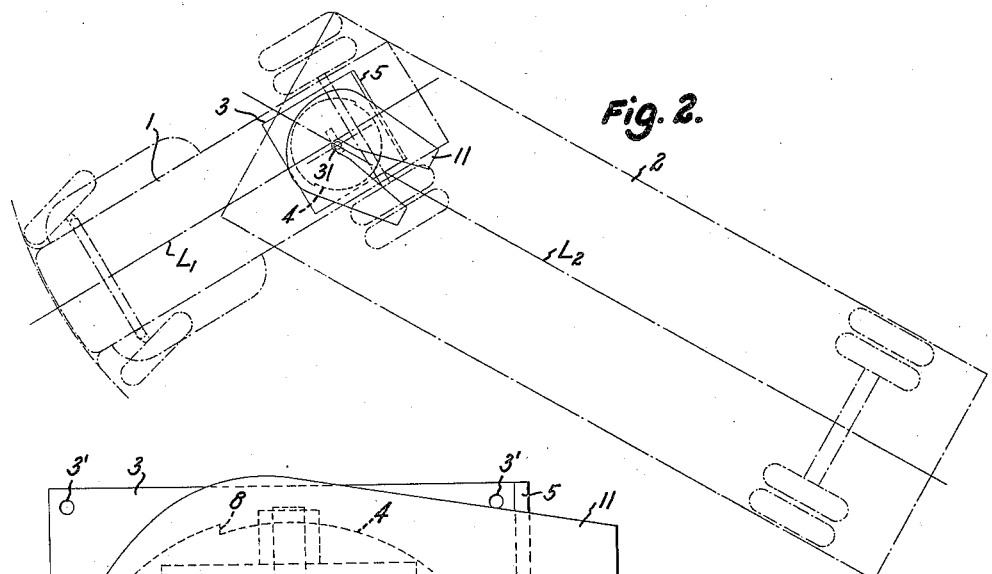
Fig. 2 is a schematic plan view of the tractor-semitrailer assembly traveling along a curved path and provided with a coupling embodying the invention.

As shown in Figs. 3 and 9, the gear 33 of the coupling pin 31 engages the midpoint of rack 34 when the tractor 1 and semitrailer 2 are alined axially for travel along a straight roadway. Assuming that the load in the semitrailer is uniformly distributed at opposite sides of the longitudinal axis of the semitrailer 2, the trailer load which is carried by the tractor unit 1 results in an equal loading upon the rear tractor wheels when the tractor-semitrailer is traveling along a linear path. The trailer load is of course transmitted in the vertical plane through the rockshaft 10 and, for a uniformly distributed load in the semitrailer 2, the trailer load is imposed upon the lower turntable plate along the axis of the coupling pin 31. When the tractor-semitrailer assembly enters a curve, as shown in Figs. 2 and 10, the turntable coupling pin 31 is moved laterally of the tractor unit, and towards the interior of the curve, by the cooperating gear 33 and rack 34. This lateral shifting of the loading of the tractor unit 1 increases the weight on or loading of the rear tractor wheels at the interior of the curved path and thereby compensates to a greater or less extent for the tendency of the inside rear wheels of the tractor to lift from the road surface. The action is similar to that of a bicycle or motorcycle rider who leans towards the center of a curved path to compensate for centrifugal forces tending to cause a skidding or upset of the bicycle or motorcycle.

As described above, the upper turntable plate 4 may be provided with radial extensions 8 for cooperation with a stop 7 on the lower turntable plate to limit the angular displacements of the axes $L_1$, $L_2$ of the tractor and semitrailer units to about 90° from a central longitudinally alined relationship. By appropriate choice of the length of the guide slot 35 and the dimensions of the bearing bushings 36, see Fig. 11, the motion-limiting action of the cooperating elements 7, 8 may be supplemented or replaced by engagement of the bearing bushings with the end walls of the slots 35.

It is to be understood that the invention is not limited to the apparatus as illustrated and described herein since various modifications in size, shape or relative arrangement fall within the spirit and scope of the invention as set forth in the following claims.

I claim:

1. In a tractor-semitrailer coupling, a turntable comprising a lower turntable plate to be rigidly mounted on a tractor, an upper turntable plate, means including a rockshaft mounted on said upper turntable plate for supporting the front end of a trailer, means connecting said turntable plates for relative angular movement about a vertical axis, and means responsive to such relative angular movement to displace said upper turntable plate laterally of said lower turntable plate and towards the center of a curved path along which the tractor-semitrailer is then traveling.

2. In a tractor-semitrailer coupling, the invention as recited in claim 1, wherein said means responsive to relative angular movement of said turntable plates includes a gear and rack connection between said turntable plates.

3. In a tractor-semitrailer coupling, the invention as recited in claim 2, wherein the gear is rigidly secured to the upper turntable plate, and the rack is carried by the lower turntable plate.

4. In a tractor-semitrailer coupling, a turntable comprising a lower turntable plate to be rigidly mounted on a tractor, an upper turntable plate, means including a rockshaft mounted on said upper turntable plate for supporting the front end of a trailer, and means connecting said turntable plates for relative angular movement, said connecting means including a pin rigidly secured to said upper turntable plate and extending through said lower turntable plate, said lower turntable plate being provided with a laterally extending slot for receiving said pin, and means responsive to relative angular movement of said turntable plates to displace said pin along said slot.

5. In a tractor-semitrailer coupling, a turntable comprising a lower turntable plate to be rigidly mounted on a tractor, an upper turntable plate, means including a rockshaft mounted on said upper turntable plate for supporting the front end of a trailer, and means connecting said turntable plates for relative angular movement; said connecting means including a pin rigidly secured to said upper turntable plate and extending through said lower turntable plate, said lower turntable plate being provided with a laterally extending slot for receiving said pin, a rack on said lower turntable plate in front of the axis of said pin when the tractor and trailer are longitudinally alined, and a gear on said pin in mesh with said rack.

6. In a tractor-semitrailer coupling, the invention as recited in claim 5, wherein said pin has a cylindrical section of circular cross-section within the slot of the lower turntable plate, and bearing members slidable along the walls of said slot have cylindrical surfaces mating with the cylindrical section of said pin.

7. In a tractor-semitrailer coupling, the invention as recited in claim 5 wherein the slot of said lower turntable has a length limiting angular movement of said turntable plates to substantially 90° from their normal positions at which the tractor and trailer are in longitudinal alinement.

JOHN N. APGAR.

No references cited.